Aug. 21, 1962     H. B. FOX     3,050,680

TESTING APPARATUS

Filed Nov. 2, 1959     2 Sheets—Sheet 1

INVENTOR.
Herman B. Fox

BY
*C. A. Gulbrandsen*

Atty.

Aug. 21, 1962     H. B. FOX     3,050,680
TESTING APPARATUS

Filed Nov. 2, 1959     2 Sheets-Sheet 2

INVENTOR.
Herman B. Fox
BY
Atty.

United States Patent Office 3,050,680
Patented Aug. 21, 1962

3,050,680
TESTING APPARATUS
Herman B. Fox, Cicero, Ill., assignor to Automatic Electric Laboratories, Inc., a corporation of Delaware
Filed Nov. 2, 1959, Ser. No. 850,201
5 Claims. (Cl. 324—51)

The present invention pertains to testing apparatus and particularly to apparatus for testing the continuity of electrical conducting paths, including the terminals and switch connections, in carriers for use in vacuum operated tube systems for interoffice mail.

In vacuum operated tube systems, the carrier forms an important part of the electrical control system and carries the destination circuits which, according to their setting, selectively actuate electro-mechanical controls to route the carrier to the desired location in the tube system. Due to the physical movement of the carrier in transit, its circuits are subject to frequent breakdowns which, if not repaired, render the carrier useless. Since the carrier is an expensive piece of equipment, it is desirable to repair the broken circuits promptly rather than to replace the carrier or provide sufficient number of spare carriers to permit extended repair time thereof. In order to make timely repairs on a faulty carrier, it is first necessary to locate and isolate the fault. Location of the fault in the carrier is hampered by the multitude of possible destination circuits in the carrier and the various combinations thereof which are effected to perform certain operations. Actual repair of the faulty circuit is generally quite simple once the breakdown has been isolated.

It is therefore, a primary object of this invention to provide means for checking each of the conducting paths in a carrier.

Another object of this invention is to provide testing apparatus for selectively testing the controls of a tube carrier.

Still another object of this invention is to provide testing apparatus for ascertaining the continuity of each printed circuit on a carrier.

Another object of this invention is to provide testing apparatus for checking all combinations of circuits in a carrier without changing its position.

These and other objects of this invention will be apparent to one skilled in the art from the following detailed description when read in conjunction with the drawings wherein.

Figure 3:
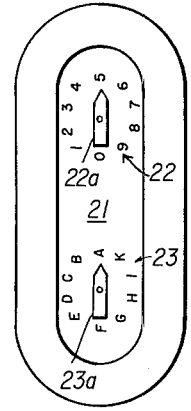
FIG. 3 is an end view of the carrier shown in FIG. 1 illustrating the selective controls.
Figure 1:
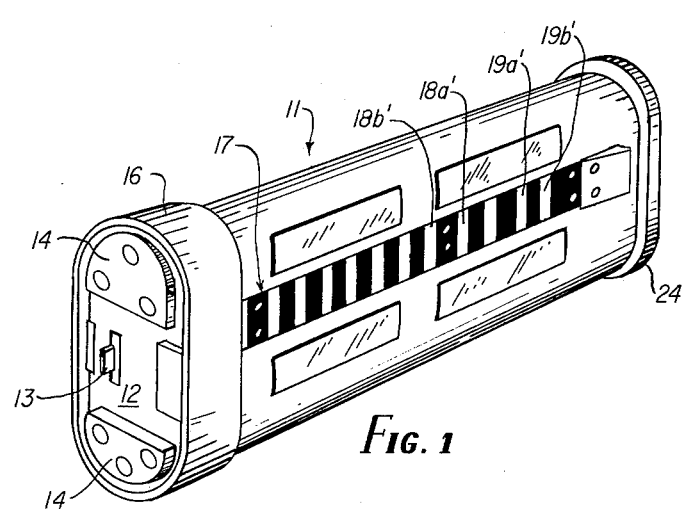
FIG. 1 is a perspective view of a carrier.
Figure 4:
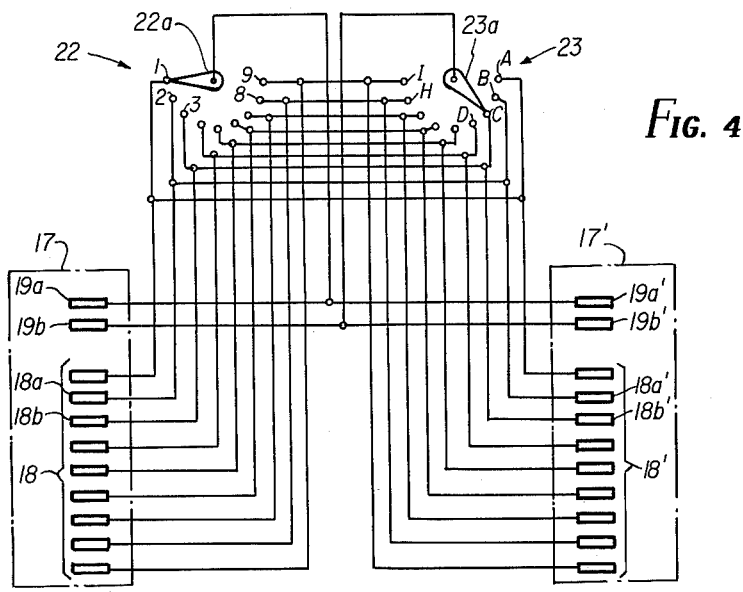
FIG. 4 is a schematic circuit diagram of the carrier destination circuits.

Referring now to FIGS. 1, 3, and 4, the carrier comprises a hollow, flattened cylindrical container 11 with a hinged access plate 12 at one end which is normally secured in place by a latch mechanism 13. The plate 12 carries a pair of bumpers 14 of felt or other shock absorbing material and is surrounded by a leather protective sleeve 16 to protect the hinges and latch mechanism during transmission of the carrier through the tube system.

The carrier has two identical printed circuit strips 17 and 17' attached parallel one another on either side of the container 11. Each of the strips 17 and 17' comprises nine station control terminals 18 and 18' respectively and two common terminals 19a and 19a', and 19b and 19b' which are wired to control travel of the carrier as will be subsequently described. The permanently closed end (FIG. 3) of the carrier comprises an end panel 21 having a numbers switch 22 and a similar letters switch 23 positioned thereon. A shock absorbing protective collar 24 is secured thereto to cushion the carrier in transit and to protect the switch mechanisms.

The common terminals 19a and 19a' on either side of the carrier are electrically connected to a wiper 22a on the numbers switch 22, and the common terminals 19b and 19b' are electrically connected to a wiper 23a on the letters switch 23. Each of the terminals 18 on the strip 17 is connected to its corresponding terminal on the opposite strip 17' and to a predetermined contact on the numbers switch and a predetermined contact on the letters switch. The destination of the carrier is controlled by the setting of the switches 22 and 23.

As an example, assume that the carrier is to be transmitted to station B1. The numbers switch 22 is turned to the 1 position and the letters switch 23 is turned to the B position. The setting of the numbers and letters switches establishes a conducting path between the selected station control terminal and the common terminals 19a, 19a'; 19b and 19b' through the wipers on the switches. As the carrier passes through the tube system, feelers in the tube test for the presence of a conducting circuit and control electro-mechanical means to direct the carrier in accordance therewith. The purpose and function of the switch contacts and the station control contacts is most readily apparent by reference to FIG. 4. The nine switch contacts of the numbers switch 22 are each multipled with the corresponding one of the contacts on the letters switch 23 by means of a printed wiring board (not shown) on the interior surface of the plate 21, i.e., the contact number "1" in the first position on the numbers switch 22 is connected with the contact number "A" in the first position on the letters switch 23. Each pair of switch contacts is connected by jumper wires to a predetermined station control terminal on each of the strips 17 and 17' thereby establishing a conducting path from either multipled contact on the switch to the station control terminal in a predetermined positioned position on each strip. The purpose of duplicate control strips 17 and 17' is to provide a control circuit on either side of the carrier to accommodate its movements in the tube and assure proper sensing at each check point without regard to its lateral movement.

Thus, it is noted that the destination circuits are completed through the common terminals 19a and 19b which are connected by jumper wires to the wipers of the numbers switch 22 and the letters switch 23 respectively. Setting of the wiper 22a establishes a conducting path from the common terminals 19a and 19a' through the wiper 22a and a selected switch contact to the selected station control terminals of the strips 17 and 17'. Potential applied between the common terminal and the selected station terminal therefore finds a conducting path to perform a control function associated with these two terminals. Due to the multiple connections, this destination circuit is established on both strips. A second destination circuit is similarly established by setting the letters switch 23.

In operation, assume that the carrier 11 is to be transmitted to a tube station designated as B3. Before placing the carrier in the tube, the sender sets the letters switch 23 on "B" and the numbers switch 22 on "3." Setting of the letters switch completes a conducting path between the common terminals 19b and 19b' and the station control terminals 18a on the strip 17 and 18a' on the strip 17'. Setting of the numbers switch 22 establishes a conducting path between the common terminals 19a and 19a' and the station control terminals 18b and 18b'. Sensing means in the tube system control the travel of the tube to its designated station in accordance with these two conducting circuits.

Figure 2:
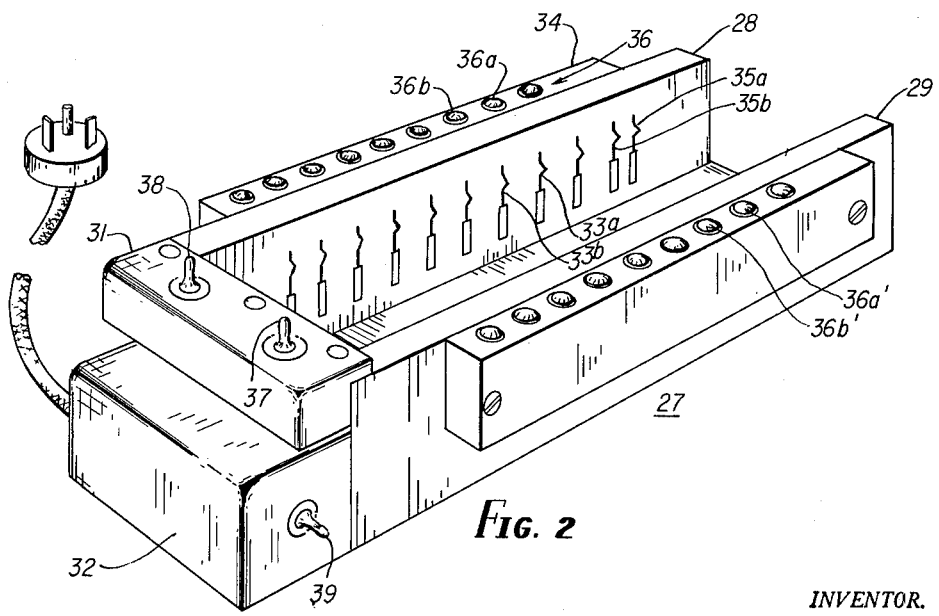
FIG. 2 is a perspective view of the testing apparatus of this invention.

Referring now to FIG. 2, the test apparatus of this invention comprises a substantially U-shaped carrier holder 27 defined by two sidewalls 28 and 29 and switch casings 31 and 32 positioned across one end of the two sidewalls. The dimensions of the U-shaped opening in the carrier holder are such as to receive and hold the carrier 11 in its normal transmitting position. The two sidewalls 28 and 29 are identical in construction and, accordingly, only the sidewall 28 will be described in detail, but it is understood that the sidewall 29 contains all elements described in wall 28.

The inner surface of the sidewall 28 carries a first plurality of nine spring contacts 33 each positioned to engage one of the station control terminals 18 and a second plurality of two spring contacts 35a and 35b each positioned for electrical connection to the common terminals 19a and 19b respectively on the strip 17. On its outer surface, the wall 28 carries a lamp box 34 including nine neon lamps 36 each connected in series between one of the spring contacts 33 and a source of potential, and in parallel with one another.

The switch casing 31 includes a letters-numbers switch 37 which, in operation, is selectively positioned to test either the letters or numbers terminal on the carrier 11 and a right-left switch 38 which, in operation, is selectively positioned to test either the right or left contact strips 17 or 17' on the carrier. The switch casing 32 contains the wiring and has an on-off switch 39 thereon.

Figure 4A:
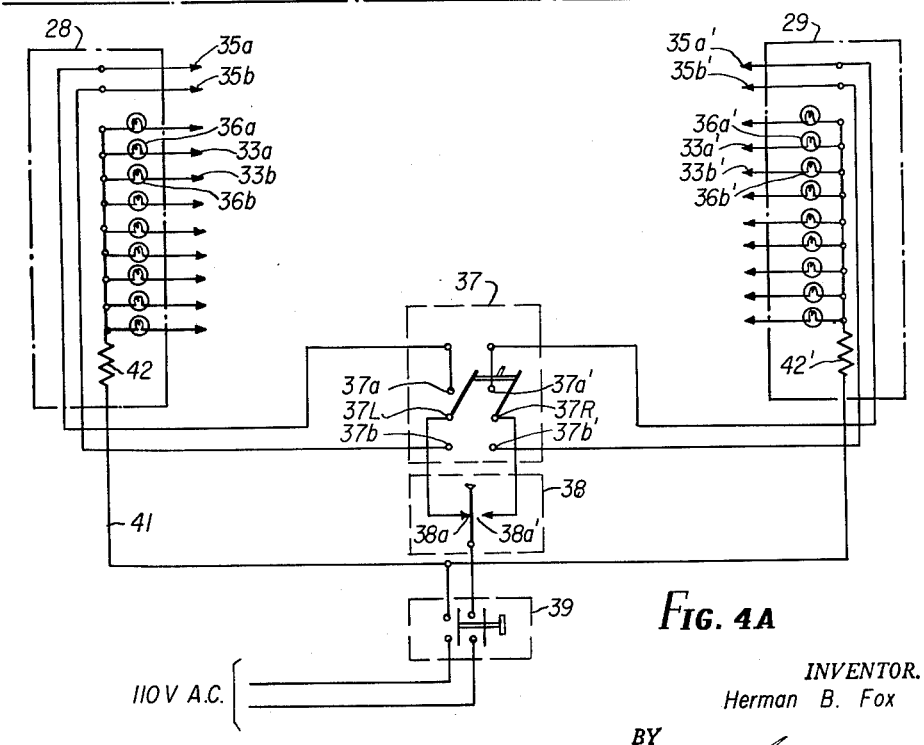
FIG. 4A is a schematic circuit diagram of the testing apparatus.

Referring now to FIG. 4A wherein the above described components of the testing apparatus are schematically shown, the spring contacts 33 and 33' on the interior of the side walls 28 and 29 respectively are connected in parallel with one another to a conductor 41 which is adapted to be connected to the negative side of an A.C. source by closure of the on-off switch 39. Each of the spring contacts 33 and 33' has an indicating lamp 36 and 36' respectively connected in series therewith and the conductor 41 has a neon lamp 42 or other voltage limiting device connected in a series with the two banks of spring contacts.

Also from the diagram of FIG. 4A, it is apparent that negative potential is present at the contacts 33 and 33' whenever the on-off switch 39 is closed. The isolation of the various destination circuits of the carrier 11 is accomplished by selective operation, in combination, of the double pole double throw numbers letters switch 37 and the single pole double throw right-left switch 38.

When the contact 38a of the switch 38 is closed, positive potential is extended to the left hand pole 37L of switch 37 and is selectively extended therefrom by operation of the numbers-letters switch to either the common spring contact 35a or 35b through 37a or 37b. Similarly, closure of the contact 38a' on the switch 38 extends positive potential to the right hand pole 37R of the switch 37 to be selectively extended to either the right hand common spring contacts 35a' or 35b' through 37a' or 37b'.

Referring once more to FIG. 4, the possible points of destination circuit failure in the carrier are: the station control terminals 18 or 18', the numbers common terminal 19a or 19a'; the letters common terminals 19b or 19b'; the position controls on the switches 22 and 23; and the jumpering between the various elements. With negative potential constantly present at the contacts 33 and 33', the destination circuits between these contacts and each of the common contacts 35a, 35b, 35a', and 35b' can be readily checked by extending positive potential thereto and checking for a completed circuit as evidenced by lighting of the indicator lamps 36 or 36' associated with the spring contact engaged with the selected station control terminal when the carrier is positioned in the test box.

Operation of the test apparatus of this invention, and the cooperation of the test circuits with the designation circuits of the carrier is best seen by reference to FIGS. 1, 2, 4, and 4A taken together to represent the engagement of the carrier with the test box. When the carrier 11 is placed in the test box 27, it is so positioned that the station control terminals 18 and 18' on the printed wiring strips 17 and 17' are in conducting contact with the spring contacts 33 and 33' respectively on the side walls 28 and 29 of the test box 27. Similarly the common terminals 19a, 19b, 19a', and 19b' are in conducting contact with the springs 35a, 35b, 35a', and 35b' on the side walls of the test box. The carrier 11 is placed in the test box 27 with the bumpers 14 on the access plate 12 abutting the closure of the box formed by the switch housings 31 and 32 so that the control switches 22 and 23 are accessible for manual operation to perform the test on the various components of the conducting paths in the carrier.

After activating the test apparatus by closing the switch 39, assume that the right-left switch 38 is in the left position so that contact 38a is closed and that the numbers-letters switch is in the numbers position so that the contacts 37a and 37a' are closed, the continuity of the station control terminals 18 and 18' and the numbers common terminal 19a are checked by rotating the wiper 22a on the switch 22 to each of the numerical positions. By way of example, when the wiper 22a is positioned on the second contact, an operating circuit for the indicator lamps associated with the spring contacts 33a and 33a' should be completed across the two sides of the power supply. Assuming no breaks in the destination circuits of the carrier, this circuit runs from the positive side of the A.C. line, through the closed contact 38a on the switch 38, the closed contact 37a on switch 37, the spring contact 35a, the numbers common terminal 19a, the wiper 22a, the second contact on the numbers switch 22, the station control terminals 18a and 18a' in parallel, the contact springs 33a and 33a', and through the indicator lamps 36a and 36a' to the negative side of the line by way of the conductor 41. Operation of the indicator lamps associated with the springs 33a and 33a' indicates that the station control terminals 18a and 18a' on the carrier are in proper operating condition as is the numbers common terminal 19a on the strip 17. If the indicator lamp 36a lights but the lamp 36a' does not light, the operator knows immediately that the station control terminal 18a' or its connection is faulty. With both indicator lamps 36a and 36a' lighted, the operator may check the right numbers common terminal 19a' by moving the switch 38 to the right position, thereby closing the contact 38a' to complete a circuit similar to that described above with the exception that it goes through the right pole 37R, the contact 37a', the contact spring 35a', and the numbers common terminal 19a' to the numbers switch. Failure of the indicator lamps to light with the left-right switch in this position indicates to the operator that the right numbers common terminal 19a' is faulty. This test may, of course, be similarly performed at any of the selected positions of either the letters or numbers switch, but it need be performed only once for each carrier.

Contacts 37b and 37b' on the switch 37 may now be closed to apply a positive potential to either spring contacts 35b or 35b' depending upon the position of the switch 38. The wiper 23a on the letters switch 23 is rotated to its various control positions to light the indicator lamps in accordance therewith. A typical operating circuit for the indicator lamps with the wiper 23a in the illustrated position on the "C" contact, the switch 37 in the letters position, and the contact 38a on the switch 38 closed, is from the positive side of the A.C. source through the contact 38a, contact 37b letters normal spring contact 35b, the letters normal terminal 19b, the wiper 23a on switch 23, over the printed circuitry and jumpering to the station control terminals 18b and 18b' in parallel, to the indicator lamps 36b and 36b' by way of the spring contacts 33b and 33b' and back to the negative side of the A.C. source through the conductor 41. Since all the individual station control terminals were previously checked, failure of a lamp to light in this portion of the test indicates failure of the contacts in the letter switch 23.

In the event that no indicator lamps are illuminated with the switch 37 in the letters position and the switch 38 in the left position, the trouble could be in either the left letters common terminal 19b or in the switch 23. One of these can be eliminated by moving the switch 38 to the right position so as to energize the same destination circuit through the right letters common terminal 19b'. If there are still no lamps illuminated with the switch 38 in this position, the operator assumes that the trouble is in the switch. If movement of the switch 38 to the right position does energize the circuit and illuminate the lamps, the operator knows that the trouble is in the left letters common contact. The numbers switch and common contacts can, of course, be similarly tested and the above described routine for testing is set forth merely as an example of operation of the testing apparatus which can be varied in accordance with the operator's convenience or preference.

While the test apparatus of this invention has been described in a specific embodiment, it should be understood various modifications may be made therein without departing from the spirit and scope of this invention.

What is claimed is:

1. A testing apparatus for a tube system carrier having a pair of substantially parallel side walls, the outside of one or both of said walls mounting a terminal strip including at least one common terminal and a plurality of station terminals, and having manual selecting means for selectively connecting said common terminal with a predetermined one of said station terminals to control the travel of said carrier through said system; said testing apparatus comprising a substantially U-shaped receptacle with at least one side wall having on its inside a plurality of connector elements disposed so as to contact said common terminals and station terminals after said carrier has been inserted into said receptacle for testing, a current source, a plurality of indicator lamps each connected to one of said connector elements, and a continuity testing circuit including in series, said source, said terminals, said selecting means, and the indicator lamp corresponding to the setting of said selecting means.

2. A testing apparatus as claimed in claim 1 wherein said indicator lamps are mounted on the corresponding side wall of said receptacle.

3. A testing apparatus as claimed in claim 1, wherein said receptacle has an end wall against which one of the end walls of said carrier abuts when inserted in said receptacle, said first mentioned end wall mounting switch means for connecting said connector element to said current source.

4. A testing apparatus as claimed in claim 1, wherein said carrier has a plurality of common terminals, wherein said selecting means include a plurality of manual selecting switches each for connecting one of said common terminals to a predetermined one of said station terminals, and wherein said testing apparatus includes a transfer switch for selectively switching said test circuit between the connector elements corresponding to said plurality of common terminals.

5. A testing apparatus as claimed in claim 1, wherein said carrier has two terminal strips, one on each of said parallel side walls, the terminals of said two strips being connected in multiple to each other wherein said receptacle has two sets of connector elements, one on the inside of each of the side walls of said receptacle, two sets of indicator lamps respectively mounted on the last-mentioned two side walls, and a throw-over switch mounted on an end wall of said receptacle for switching said testing circuit between said two sets of connector elements.

References Cited in the file of this patent

UNITED STATES PATENTS

| | | |
|---|---|---|
| 2,814,774 | Wong | Nov. 26, 1957 |
| 2,977,530 | Cook | Mar. 28, 1961 |